Oct. 30, 1923. 1,472,121
J. H. HAND
CHANGE SPEED GEARING
Filed Dec. 30, 1920 4 Sheets-Sheet 1
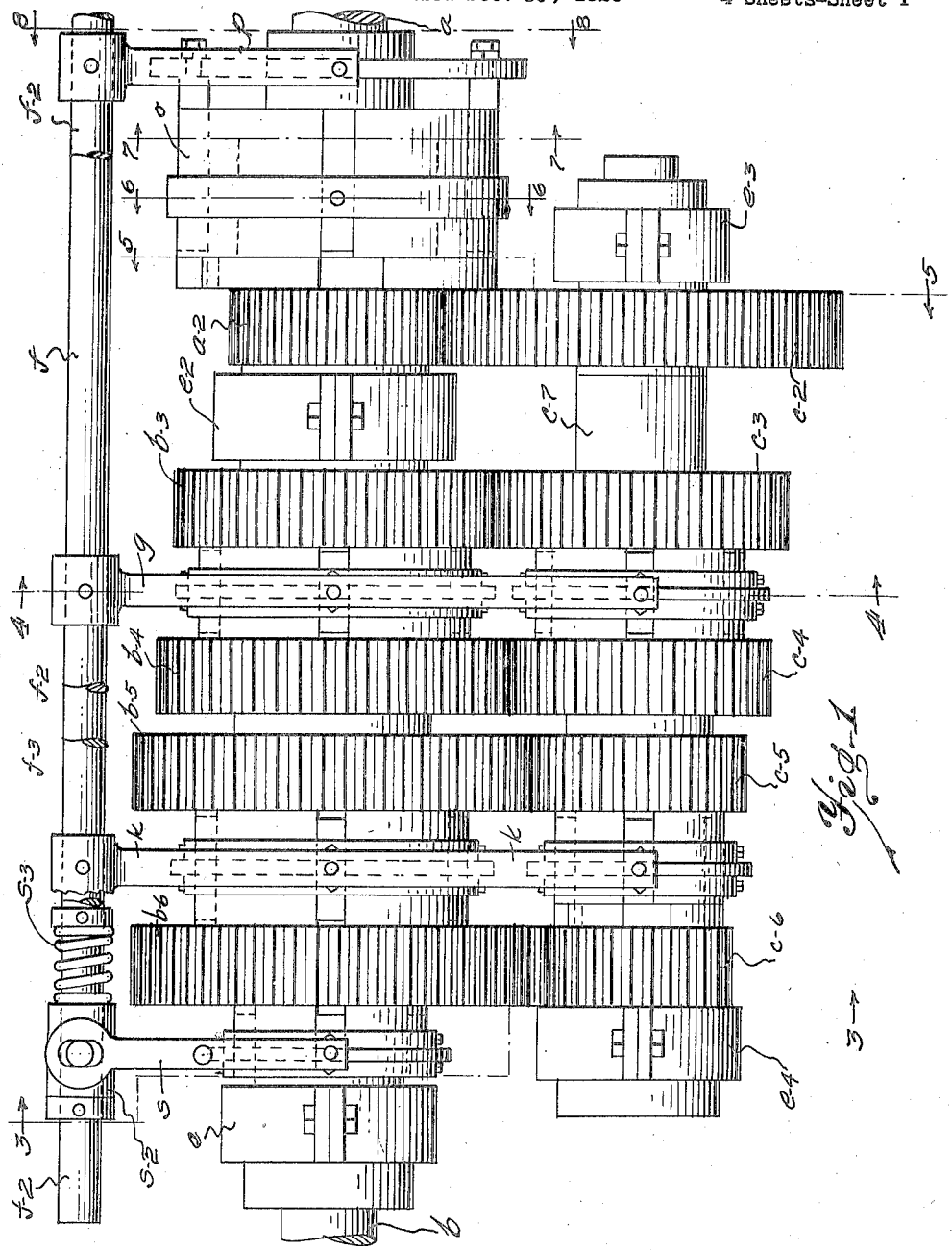
INVENTOR.
JESSE H. HAND.
BY
Raymond A. Parker
ATTORNEY.

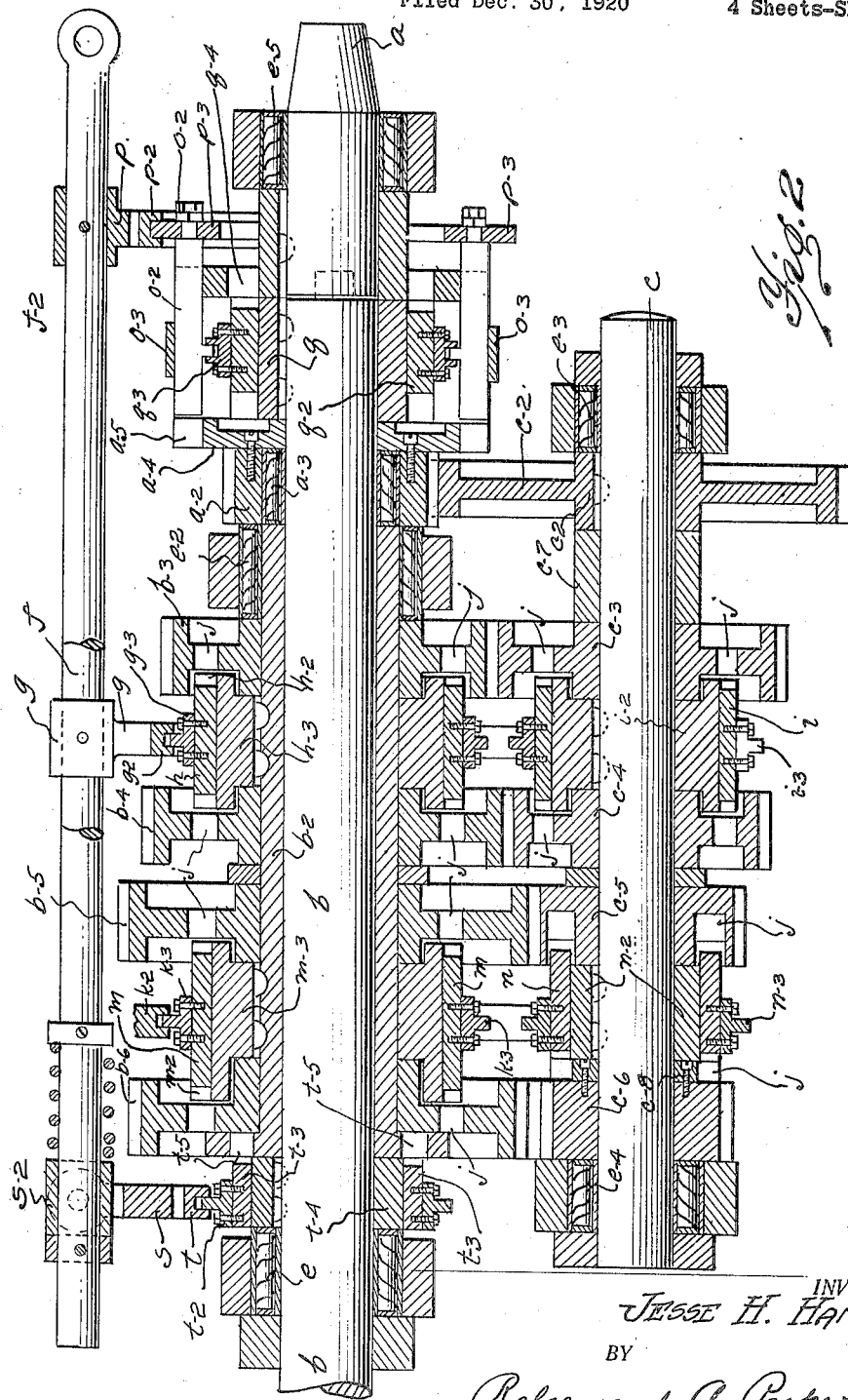

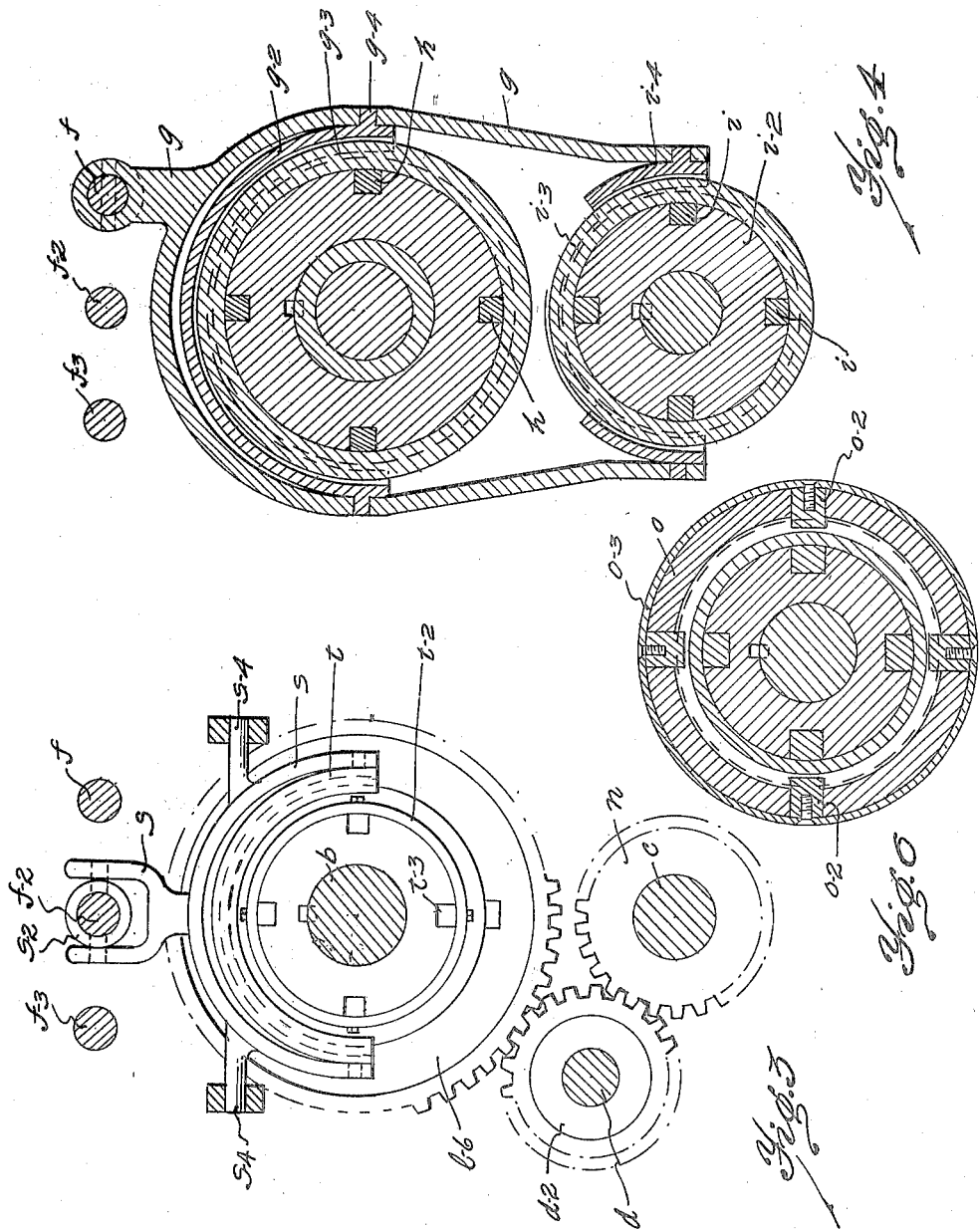

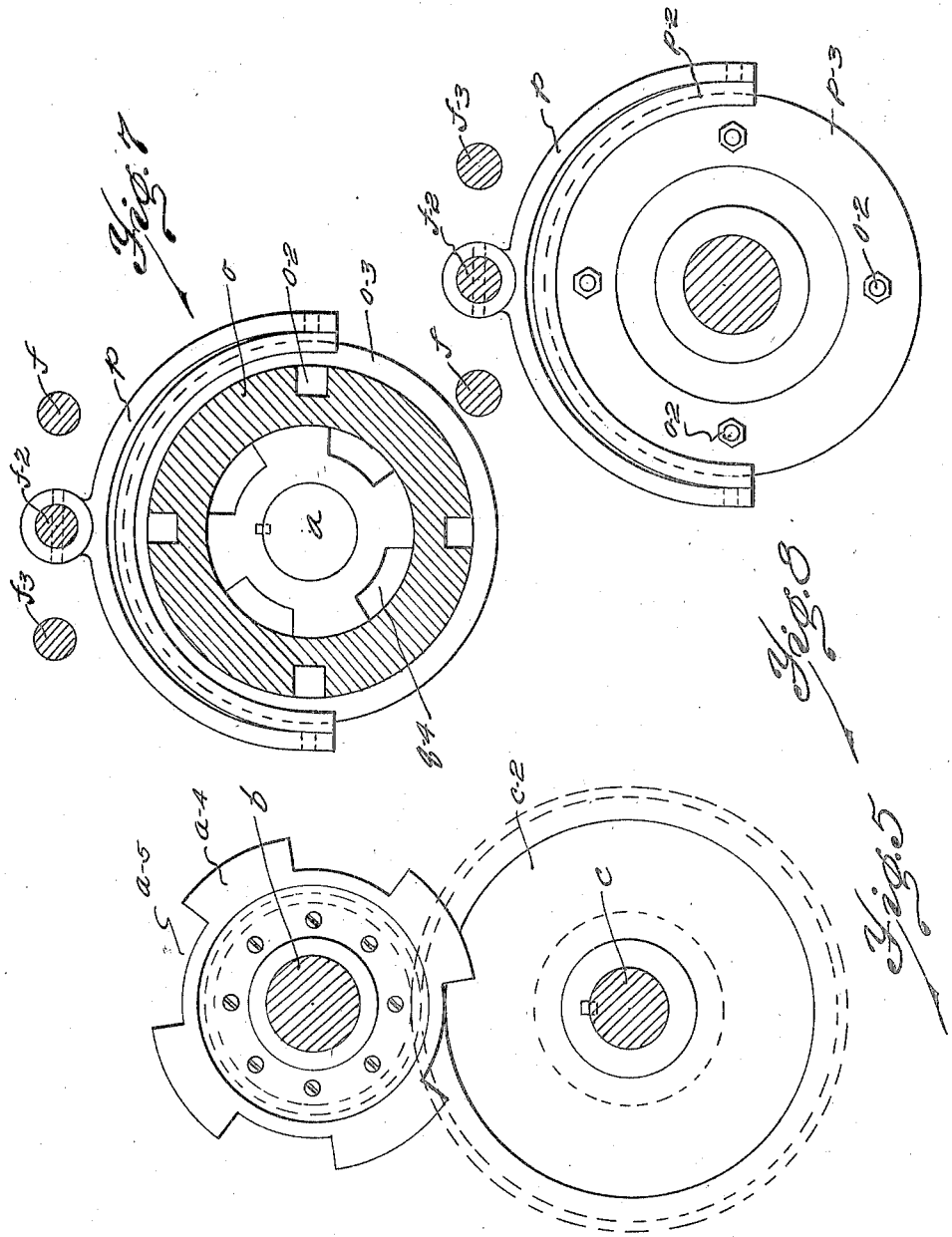

Patented Oct. 30, 1923.

1,472,121

UNITED STATES PATENT OFFICE.

JESSE H. HAND, OF DETROIT, MICHIGAN.

CHANGE-SPEED GEARING.

Application filed December 30, 1920. Serial No. 434,001.

*To all whom it may concern:*

Be it known that I, JESSE H. HAND, a citizen of the United States, residing at Detroit, county of Wayne, State of Michigan, have invented a certain new and useful Improvement in Change-Speed Gearing, and declare the following to be a full, clear, and exact description of the same, such as will enable others skilled in the art to which is pertains to make and use the same, reference being had to the accompanying drawings, which form a part of this specification.

My invention relates to constant mesh change speed gearing for automotive vehicles. An object is to provide a change speed gearing of the constant mesh type, of simple construction and possessing a minimum of moving parts which is easy of operation. More particularly an object is to provide a change speed gearing in which the driving shaft and main shaft may be coupled directly together so as to drive the main shaft independently of all the change speed gears and further adapted so that at any speed the only gears in motion will be those performing work.

This invention is an improvement of my invention disclosed in patent application #417,329 filed Oct. 16th, 1920.

Figure 1 is a side elevation of my change speed gearing in which certain parts are broken away.

Fig. 2 is a vertical cross-section of my change speed gearing.

Fig. 3 is a cross-section taken on line 3—3, Fig. 1.

Fig. 4 is a cross-section taken on line 4—4, Fig. 1.

Fig. 5 is a cross-section taken on line 5—5, Fig. 1.

Fig. 6 is a cross-section taken on line 6—6, Fig. 1.

Fig. 7 is a cross-section taken on line 7—7, Fig. 1.

Fig. 8 is a cross-section taken on line 8—8, Fig. 1.

Let $a$ indicate the driving shaft driven from the engine; $b$ the main shaft; $c$ the counter shaft and $d$ the shaft on which the reverse gear is mounted. The main shaft is supported by bearings $e$ and $e^2$; the counter shaft by bearings $e^3$ and $e^4$, and the driving shaft is shown as provided with a bearing $e^5$.

The main shaft carries a sleeve $b^2$, adapted to permit independent rotation of the main shaft but also adapted to be locked to such shaft so as to rotate therewith. Mounted on this sleeve is a series of gears comprising a low speed gear $b^5$, two intermediate gears $b^4$ and $b^3$ and reverse gear $b^6$. These gears are so mounted as to permit the sleeve to be rotated independently of each of its carried gears. Selective means are provided for locking individual gears to such sleeve to rotate therewith.

Mounted on the counter shaft is a series of gears in constant mesh with the above gears on the main shaft sleeve. These counter shaft gears are so mounted on the shaft as to permit the counter shaft to be independently rotated, but selective means is provided to lock individual gears to the shaft. The gears comprise a low speed gear $c^5$, two intermediate gears $c^4$ and $c^3$ and a reverse gear $c^6$ which mesh with similarly numbered $b$ gears on the main shaft.

Carried by the counter shaft is a large gear $c^2$ separated from change speed gear $c^3$ by means of spacer collar $c^7$, which gear $c^2$ is fixed to the counter shaft so as to rotate therewith. Gear $c^2$ is in constant mesh with a driving gear $a^2$ independently rotatably mounted on the main shaft $b$. Gear $a^2$ is carried by suitable bearings $a^3$ and when driven serves to rotate gear $c^2$ and through such gear the counter shaft $c$.

The selective means employed to lock independent gears on the main shaft sleeve and counter shaft to such sleeve and shaft are adapted to operate in unison. These selective means comprise conventional shift rods $f$, $f^2$ and $f^3$ adapted for longitudinal shifting movement. This is conventional practice. These rods carry shifting forks which are adapted to reciprocate sliding keys which keys are carried in key-ways provided in fixed collars mounted on the counter shaft and the sleeve carried by the main shaft.

The shift rod $f$, for example, carries shifting fork $g$ to which is pivoted as at $g^4$ a shifting ring $g^2$ which ring is grooved to receive the tongue of a key retaining ring $g^3$ which retaining ring encircles a collar $h^3$ which collar is keyed to the sleeve $b^2$. Carried by this key retaining ring are locking keys $h$ disposed within slotted key-ways $h^2$ in the collar so as to be moved longitudinally therethrough into and out of engagement with gears $b^3$ and $b^4$.

The keys engage in provided slots $j$ in the gears. These slots $j$ may be of such size as may be desired. This fork $g$ is also adapted to shift, in similar manner, keys $i$ carried by a collar $i^2$ which collar is fixed to the counter shaft. The retaining ring in such case is indicated as $i^3$ and the shifting ring as $i^4$. By means of this type of construction it will be seen that the keys $i$ carried by the collar on the counter shaft and the keys $h$ carried by the collar on the main shaft sleeve will be shifted simultaneously and in the same direction so that both the gears of the working pair will be locked to their respective shafts at substantially the same time.

To facilitate locking both gears of the pair to their respective shafts the keys carried by the collar on one shaft should be of such length—in the drawings the keys carried by the collar on the counter shaft are shown as of greater length than the keys carried by the collar on the main shaft—as to permit the gear on such shaft to be rotatably engaged before the gear on the other shaft is engaged. Were this not the case there might be a failure to pick up the gears. With such an arrangement this gear on the counter shaft would be picked up first, and would rotate its other gear in pair, carried by the sleeve on the main shaft, until such gear is in turn picked up by its locking keys.

Through the actuation of shifting fork $g$ either of the intermediate pairs of gears may be engaged for rotation.

In connection with shift rod $f^3$ I provide a fork $k$ carried thereby. This construction is similar to the construction just described. There is a shifting ring $k^2$ which receives a key retaining ring $k^3$ which key retaining ring carries keys $m$ which keys are disposed for slidable longitudinal movement within provided key ways $m^2$ formed in a collar $m^3$ fixed to the sleeve $b^2$. These keys are adapted to be received in the provided openings $j$ in the low gear $b^5$ or in the openings $j$ in the reverse gear $b^6$ so as to lock these gears independently to the sleeve $b^2$. Adapted for simultaneous movement and in the same direction are keys $n$ disposed in provided key-ways in a collar $n^2$ which collar is secured to a counter shaft. These keys are held by a retaining ring $n^3$ which ring is engaged by a shifting ring not shown in the drawing but of similar construction to the one previously described and shown in Fig. 4.

Owing to the small diameter of the reverse gear $c^6$ there is attached to the side of such gear a key plate $c^8$ slotted to provide openings for the keys $n$ so as to lock the gear $c^6$ to the collar $n^2$ in order that such gears will rotate with the counter shaft. This gear $c^6$ is in constant mesh with gear $d^2$ carried on shaft $d$ which gear is in turn constantly engaged with gear $b^6$ on the sleeve $b^2$.

To pick up the counter shaft and through such shaft to pick up the reverse gear or any of the desired change speed gears I provide means for engaging the independently rotatable driving gear $a^2$ which is mounted on the main shaft with the driving shaft $a$. This means is fully described in my patent application #417,329, filed Oct. 16th, 1920, above referred to, and comprises a hub $o$ provided with slotted key-ways adapted to receive keys $o^2$ which keys are bound together as a unit by means of a key-retaining ring $o^3$. Shifting fork $p$ is carried by shift rod $f^2$ which fork carries a shifting ring $p^2$ which in turn engages a key retaining plate $p^3$ as shown in Fig. 8 to which plate the keys $o^2$ are fastened so as to be shifted thereby.

These keys $o^2$ serve to lock the hub $o$ to the driving gear $a^2$ in order that such hub and driving gear may rotate as one piece. Due to the small diameter of the driving gear this locking is by way of a key plate $a^4$ fastened to the side of the gear which key plate is provided with slotted key openings $a^5$ as shown in Fig. 5.

The hub $o$ is cored out to receive the end of the main shaft. Secured to the main shaft so as to rotate therewith and interior the hub $o$ is a collar $q$ which is slotted to receive keys $q^2$. These keys are retained in position in the provided key-ways by means of a key retaining ring $q^3$ which serves to move the keys as a unit and which ring is in turn engaged by the keys $o^2$ by means of the tongue and groove construction shown in Fig. 2 of drawing.

These keys $q^2$ are adapted to engage in slotted openings $q^4$ in the interior of the hub so as to lock the hub carried by the driving shaft and the collar $q$ fixed to the main shaft together so that the driving shaft and main shaft will rotate as one member, independently of all the change speed gears.

It will be seen that this hub mechanism permits of three positions for the clutch engagement; a direct drive in which the keys $q^2$ are engaged in the openings $q^4$ in the hub which locks the driving shaft and the main shaft together; the neutral position, shown in Fig. 2, in which the keys $o^2$ are disengaged from the plate $a^4$ and the keys $q^2$ are disengaged from the hub $o$; and any drive through the counter shaft in which the keys $o^2$ are engaged in the openings $a^5$ in the plate $a^4$ so as to drive the counter shaft as previously described.

It is apparent that when the driving is through the counter shaft, and any one of the selected gears on the sleeve, to drive the main shaft it will be necessary to lock the sleeve to such shaft. Means are, therefore, provided to lock such sleeve and shaft together coincident with the engaging of the keys $o^2$ in the plate $a^4$.

Shifting rod $f^2$ carries at the end of the change speed gearing opposite the engine end a shifting fork $s$ pivoted to a sleeve $s^2$ mounted on shift rod $f^2$ which sleeve is held yieldingly against a fixed shoulder on the rod by means of a spring $s^3$. This shifting fork is pivoted intermediate its ends to the transmission casing, as at $s^4$, Fig. 3, so that the fork may be rocked back and forth. At its lower end this shifting fork carries a shifting ring $t$ which ring is engaged with a key retaining ring $t^2$ which retaining ring encircles keys $t^3$ carried by a collar $t^4$ which collar is fixed to the main shaft. Due to the method of pivoting the shifting fork the direction of movement of the keys $t^3$ will be the reverse of the movement of the shift rod. These keys $t^3$ are adapted to engage in slotted openings $t^5$ in the flange on the end of the sleeve $b^2$. Shifting forks $p$ and $s$ being both mounted on the same shift rod are moved simultaneously, therefore, when the keys $o^2$ are thrown into engagement with the gear $a^2$ the keys $t^3$ are thrown into engagement with the sleeve $b^2$. Disengagement of these two sets of keys is likewise co-ordinated. The shifting fork $s$ is yieldingly mounted on the shift rod $f^2$, as shown, so that should the keys $t^3$ fail to engage the sleeve $b^2$ as the keys $o^2$ are thrown into position to engage the gear $a^2$ the keys $o^2$ will be permitted to pick up the gear $a^2$ which will serve to rotate the sleeve, after the desired change speed gear has been picked up, sufficiently to bring the key-ways $t^5$ in the end of the sleeve into position so that the keys $t^3$ may engage therein.

In operation this change speed gear permits of a direct drive from the driving shaft through the main shaft with all the gears standing idle. In driving through any of the change speed gears or through the reverse, all the gears are idle except the gears performing labor; for example, if it is desired to go into low from the neutral position shift rod $f^2$ is actuated to lock the gear $a^2$ to the hub carried by the driving shaft and coincident with such movement the sleeve $b^2$ is locked to the main shaft through the keys $t^3$. Shift rod $f$ is now actuated to lock the gears $b^3$ and $c^3$ to the sleeve $b^2$ and the counter shaft respectively. While the gearing is so operated the only moving gears will be $a^2$, $c^2$, $c^3$ and $b^3$. A similar condition would be true in driving through any of the other gears on the counter shaft.

Claims:

1. In a change speed gear, a main shaft, a sleeve carried by such main shaft in such a manner that the shaft may be rotated independently thereof, means for locking such sleeve to the shaft to rotate therewith, a series of gears loosely mounted on such sleeve but adapted to be locked individually thereto to rotate therewith, a counter shaft, a series of gears loosely carried on said counter shaft but adapted to be locked individually thereto to rotate therewith, a driving shaft, means for coupling the counter shaft up with the driving shaft so as to be rotated thereby, means for locking any loose gear on the counter shaft thereto so as to rotate with such shaft and coincident therewith locking its co-operating gear on the main shaft sleeve to such sleeve to rotate therewith.

2. In a change speed gear, a main shaft, a sleeve carried by said main shaft in such a manner that the shaft may be rotated independently thereof, means for locking said sleeve to the shaft to rotate therewith, a series of gears loosely mounted on said sleeve but adapted to be locked individually thereto to rotate therewith, a counter shaft, a series of gears loosely carried on said counter shaft but adapted to be locked individually thereto to rotate therewith, a driving shaft, means for coupling the counter shaft up with the driving shaft so as to be rotated thereby, means for locking any loose gear on the counter shaft thereto so as to rotate with such shaft and coincident therewith locking its co-operating gear on the main shaft sleeve to the sleeve to rotate therewith, means for coupling the main shaft directly with the driving shaft so as to rotate as one piece independently of all the gears.

3. In a change-speed gearing, a driving shaft, a main shaft, a sleeve mounted on the main shaft in such a manner as to permit rotation of the main shaft independently of the sleeve, means for locking the sleeve to the main shaft so as to rotate therewith, a series of change speed gears mounted on the sleeve in such a manner as to permit rotation of the sleeve independently of any gear, a counter shaft, a series of change-speed gears mounted on the counter shaft in such a manner as to permit the counter shaft to be rotated independently thereof, means for coupling up the counter shaft with the driving shaft so the counter shaft will be driven thereby and coincident therewith coupling the sleeve with the main shaft, means for coupling any change-speed gear on the counter shaft thereto to rotate therewith and at substantially the same time coupling the co-operating gear in pair on the main shaft sleeve with such sleeve to rotate therewith, means for coupling the main shaft directly with the driving shaft when the counter shaft is disengaged from its driving relation with such driving shaft.

4. In a change speed gear, a driving shaft, a main shaft, a sleeve mounted on the main shaft in such a manner as to permit of independent rotation of the shaft, a series of gears mounted on the sleeve so as to permit the independent rotation of the sleeve, such gears adapted to be individually locked to such sleeve so as to rotate therewith, a counter shaft, a series of gears mounted on the counter shaft in such a manner as to permit of independent rotation of the shaft, such gears adapted to be locked individually to the counter shaft so as to rotate therewith, an independently rotatable driving gear carried by the main shaft, a gear fixed to the counter shaft to rotate therewith, which gear on the counter shaft is in constant mesh with the driving gear on the main shaft, means for locking the independently rotatable driving gear on the main shaft to the driving shaft to rotate therewith, means for coupling the sleeve on the main shaft with such shaft to rotate therewith, means for coupling the main shaft directly with the driving shaft to rotate as one member indpendently of all the gears, means for coupling any of the gears mounted on the sleeve with such sleeve to rotate therewith and by the same movement coupling the co-operating gear in the train on the counter shaft to such shaft.

5. In a change-speed gear, a driving shaft, a main shaft, a sleeve mounted on the main shaft in such a manner as to permit of independent rotation of the shaft, a series of gears mounted on the sleeve so as to permit of independent rotation of the sleeve, such gears adapted to be individually locked to such sleeve so as to rotate therewith, a counter shaft, a series of gears mounted on the counter shaft in such a manner as to permit of independent rotation of the shaft, such gears adapted to be locked individually to the counter shaft so as to rotate therewith, an independently rotatable driving gear carried by the main shaft, a gear fixed to the counter shaft to rotate therewith, which gear on the counter shaft is in constant mesh with the driving gear on the main shaft, means for locking the independently rotatable driving gear on the main shaft to the driving shaft to rotate therewith, means for coupling the sleeve on the main shaft with such shaft to rotate therewith coincident with the coupling of the driving gear mounted on the main shaft in its driving relation with the driving shaft, means for coupling the main shaft directly with the driving shaft to rotate as one member independently of all the gears, means for coupling any gear on the main shaft sleeve to such sleeve to rotate therewith and also coupling by the same movement the co-operating gear in the train carried on the counter shaft to such counter shaft to rotate therewith.

6. In a change-speed gearing, a driving shaft, a main shaft, a sleeve mounted on said main shaft to permit independent rotation of the shaft, means for locking said main shaft to said driving shaft to rotate as one piece therewith independently of the sleeve, means for locking said sleeve to said shaft to rotate therewith, a plurality of change-speed gears mounted on said sleeve to permit rotation of the sleeve independently of any gear and means for locking any individual gear on the sleeve thereto to rotate therewith, and means for driving said main shaft from said driving shaft through the sleeve and any one of the gears thereon.

7. In a change-speed gearing, a driving shaft, a main shaft, a sleeve mounted on said main shaft permitting indepndent rotation of the shaft, change-speed gears mounted on said sleeve to permit rotation of the sleeve independent of any gear thereon, means for coupling said driving shaft to said main shaft to drive therethrough independently of the sleeve, means for coupling any gear on the sleeve thereto to rotate therewith and at substantially the same time coupling the driving shaft to the main shaft through the gear coupled to the sleeve to drive said main shaft at varying rates of speed.

8. In a change-speed gearing, in combination, a drive shaft, a main shaft, a counter shaft, a sleeve mounted on said main shaft to permit independent rotation of the shaft, a series of change-speed gears mounted on said sleeve to permit rotation of the sleeve independently of any gear, a corresponding series of change-speed gears mounted on the counter shaft constantly in mesh with the gears on the sleeves, which gears are so mounted on the counter shaft as to permit rotation of the counter shaft independently of any gear thereof, means for coupling said driving shaft with said main shaft to rotate independently of the sleeve, means for coupling said driving shaft with said counter shaft to drive the same and at substantially the same time coupling the sleeve with said main shaft to rotate therewith, and means for coupling any gear on the counter shaft thereto to rotate therewith and with the same movement but slightly thereafter coupling the corresponding gear in pair on the sleeve to said sleeve to rotate therewith to drive the main shaft from the driving shaft through the counter shaft at varying rates of speed.

In testimony whereof I sign this specification.

JESSE H. HAND.